(12) United States Patent
Louise et al.

(10) Patent No.: US 9,233,762 B2
(45) Date of Patent: Jan. 12, 2016

(54) METHOD AND DEVICE FOR DISPLAYING FLIGHT PARAMETERS ON AN AIRCRAFT

(71) Applicant: Airbus Operations (SAS), Toulouse (FR)

(72) Inventors: Pascale Louise, Toulouse (FR); Fabien Perrin, Toulouse (FR); Delphine MacDonald, Toulouse (FR); Nicolas Chauveau, Montpellier (FR)

(73) Assignee: Airbus Operations (SAS), Toulouse (FR)

( * ) Notice: Subject to any disclaimer, the term of this patent is extended or adjusted under 35 U.S.C. 154(b) by 122 days.

(21) Appl. No.: 14/048,615

(22) Filed: Oct. 8, 2013

(65) Prior Publication Data

US 2014/0100722 A1 Apr. 10, 2014

(30) Foreign Application Priority Data

Oct. 8, 2012 (FR) ...................................... 12 59538

(51) Int. Cl.
*B64D 45/00* (2006.01)
*G01C 23/00* (2006.01)
*G01D 7/02* (2006.01)

(52) U.S. Cl.
CPC ................ *B64D 45/00* (2013.01); *G01C 23/00* (2013.01); *G01D 7/02* (2013.01)

(58) Field of Classification Search
None
See application file for complete search history.

(56) References Cited

U.S. PATENT DOCUMENTS

| 2004/0183699 | A1* | 9/2004 | Vialleton et al. ............... 340/978 |
| 2007/0005198 | A1 | 1/2007 | Maris |
| 2008/0140270 | A1* | 6/2008 | Davis et al. ....................... 701/8 |
| 2010/0023258 | A1 | 1/2010 | Rouquette et al. |
| 2011/0208376 | A1 | 8/2011 | Mere et al. |

FOREIGN PATENT DOCUMENTS

| EP | 2360450 | 5/2011 |
| FR | 2887329 | 12/2006 |

OTHER PUBLICATIONS

French Search Report, Jun. 17, 2013.

* cited by examiner

*Primary Examiner* — John R Olszewski
*Assistant Examiner* — James M McPherson
(74) *Attorney, Agent, or Firm* — Greer, Burns & Crain, Ltd.

(57) ABSTRACT

The display device comprises display means which highlight on a screen, preferably of PFD type, the information useful to the pilot relating to at least one flight parameter, especially while reducing the corresponding scale on said screen.

15 Claims, 5 Drawing Sheets

METHOD AND DEVICE FOR DISPLAYING FLIGHT PARAMETERS ON AN AIRCRAFT

CROSS-REFERENCES TO RELATED APPLICATIONS

This application claims the benefit of the French patent application No. 12 59538 filed on Oct. 8, 2012, the entire disclosures of which are incorporated herein by way of reference.

BACKGROUND OF THE INVENTION

The present invention relates to a method and a device for displaying flight parameters on an aircraft, especially a transport airplane. This display device is capable of representing a dialog device allowing dialog between an operator of the aircraft, in particular a pilot, and a system for guidance of said aircraft.

It is known that aircraft furnished with a guidance system, namely either a flight director which calculates piloting setpoints as a function of guidance setpoints or an automatic piloting system which makes it possible to follow guidance setpoints in an automatic manner, are provided with an overview (or summary) of the behavior of this guidance system which allows the pilot of the aircraft to ascertain the aircraft guidance modes.

An overview of the behavior of the guidance system (flight director or automatic piloting system, possibly associated with automatic thrust control) is effected, in general, on the screens displaying the primary flight parameters, of PFD ("Primary Flight Display") type, at the level of a table of FMA ("Flight Mode Annunciator") type. This overview summarizes, generally, the guidance modes engaged (active) on each axis (speed, lateral, vertical), as well as the armed guidance modes, that is to say those which have been requested by the pilot and which will engage automatically when mode engagement conditions are fulfilled. By way of example, away from the trajectory of the flight plan, in the mode for holding heading converging toward the trajectory of the flight plan with the flight plan trajectory capture and holding mode armed, the latter mode engages automatically on approach to the flight plan.

By way of non-exhaustive example, the guidance modes taken into account in the table of FMA type can be the following:

mode of the auto-throttle:
"THRUST": mode commanding a fixed thrust;
"SPEED": mode commanding a variable thrust making it possible to uphold an air speed setpoint (CAS) or MACH setpoint, etc.;
vertical mode:
"OP CLB": mode of climbing toward a setpoint altitude with a fixed thrust while complying with an air speed (CAS);
"OP DES": mode of descending toward a setpoint altitude with a reduced fixed thrust while complying with an air speed (CAS);
"VS": mode of holding of a vertical (climb or descent) speed;
"FPA": mode of (climb or descent) slope holding;
"G/S": mode of tracking a vertical axis corresponding to an approach beam, etc.;
lateral mode:
"HDG": heading capture and holding mode (HEADING);
"TRK": course capture and holding mode (TRACK);
"NAV": flight plan tracking mode (route);
"LOC": mode of tracking a lateral axis corresponding to an approach beam, etc.;
category of approach (indicating, inter alia, whether or not an automatic landing is possible depending on the state of the onboard systems); and
state of the functions (indicating the state of engagement of the guidance systems such as the automatic piloting system, the flight director, the automatic thrust management).

Moreover, the engaged (active) modes and also the armed modes are indicated to the pilot by the table of FMA type.

By virtue of this textual summary of the present (engaged) and forthcoming (armed) guidance modes, the pilot has an overview of the objectives taken into account by the guidance system.

In order to supplement this picture, the pilot will thereafter look at the guidance setpoints associated with the guidance modes on the PFD screen, as well as the current flight parameters. These two values (current value and setpoint value) are displayed on one and the same scale making it possible to see their relative positions (inter alia), and their positions with respect to characteristic values (for example characteristic speeds on the speed scale).

In the mode of climbing toward an altitude, the value of the altitude setpoint taken into account by the system lies on the altitude scale of the PFD screen.

The set made up of the FMA table and of the PFD screen affords the pilot access to a complete picture of the behavior of the guidance system.

The FMA table provides a textual summary which requires a learning on the part of the pilots so as to associate the behavior of a mode with its textual label. For example, with this type of textual retrieval, the pilot must know (learn) that, for the label "OP CLB", the behavior of the mode is that of a climb with no altitude constraint to a flight level, with a fixed thrust for the engines (on the "Climb" level), while complying with an air speed (CAS). On the other hand, the "CLB" mode will indicate compliance with the altitude constraints on the climb if appropriate.

SUMMARY OF THE INVENTION

The present invention relates to a method of displaying flight parameters on an aircraft capable of being guided by a guidance system according to one of a plurality of guidance modes, the object of which is to support the pilot's understanding relating especially to the behavior of the aircraft's guidance modes.

For this purpose, according to the invention, said method of displaying flight parameters on an aircraft, with the aid of at least one viewing screen, preferably a piloting screen of PFD ("Primary Flight Display") type, comprising display elements dedicated to given flight parameters which each comprise at least one corresponding scale, said aircraft being capable of being guided by a guidance system according to one of a plurality of guidance modes, is noteworthy in that said aircraft guidance system is monitored so as to be able to detect a situation in which: the aircraft is guided by said guidance system according to a guidance mode having as objective at least one given guidance setpoint relating to a given flight parameter and said guidance mode holds this given guidance setpoint, and wherein, when such a situation is detected, a scale part which is reduced to a size corresponding at most to a holding range for said guidance setpoint (as a function of the performance of the system) is highlighted on the display element dedicated to said flight parameter and displayed on the viewing screen. This scale part thus reduced is termed "reduced scale part" hereinafter. This holding range can be a range considered to be acceptable for this guidance setpoint or else simply the current value alone (which, in this case, corresponds to the setpoint value).

Thus, by virtue of the invention, a display highlighting the information useful to the pilot relating to a flight parameter, while reducing the corresponding scale, is available on the screen, preferably of PFD type. This simplifies the reading and understanding of the display for the pilot.

The present invention can be applied to any guidance setpoint used by a guidance system and capable of being displayed, and especially to the following guidance setpoints: speed, heading, altitude, vertical speed/slope.

Furthermore, in an advantageous manner, if said aircraft is guided with the holding of a plurality of guidance setpoints, a reduced scale part is highlighted for each of said upheld guidance setpoints. Thus, by looking at the screen, the pilot is directly informed that all the requested guidance setpoints are upheld by the guidance system.

Moreover, advantageously, if for a flight parameter a guidance setpoint is modified by the input of a new guidance setpoint (by the pilot or by the system in managed mode for example), a scale part is highlighted starting from the current value of this flight parameter as far as said new guidance setpoint. Thus, the pilot is informed visually of this situation, and of the difference between the current value and that which the system seeks to attain.

Moreover, in an advantageous manner, if the current value of a flight parameter strays from the guidance setpoint (for example because of a wind gradient which modifies the air speed), a scale part defined between these two values is also highlighted.

Furthermore, advantageously, the trend, increasing or decreasing, of a flight parameter of the aircraft is monitored, and the part of the scale (preferably a half-scale) is displayed onward of the current value of this flight parameter, corresponding to the trend of the aircraft, if there is no corresponding guidance setpoint, doing so as far as the guidance setpoint if it is situated on this scale part.

Moreover, in an advantageous manner, a check is performed to verify whether the motion of the aircraft is consistent with a guidance setpoint relating to a flight parameter, and as a function of this verification:
  if the motion of the aircraft is consistent with this guidance setpoint, then only a part of the scale is displayed onward of the current value of this flight parameter, doing so in the direction of the motion of the aircraft; and
  if the motion of the aircraft is not consistent with this guidance setpoint, the scale is unraveled in both directions with respect to the current value of the flight parameter, doing so on a complete half-scale in the direction of the motion of the aircraft, and on the part of the scale going as far as the setpoint in the opposite direction, so as to highlight this situation.

Furthermore, advantageously, for a flight parameter corresponding to a speed of the aircraft, the set of useful speed values is displayed permanently on a speed scale (in contradistinction to a partial amplitude scale centered on the current value). This solution affords the pilot visual information on the state of the speed, namely if it is high (graphically at the top of the fixed scale) or low (graphically at the bottom of the fixed scale).

Moreover, in an advantageous manner, for at least one scale dedicated to a flight parameter (for example a speed or heading scale), the entirety of the scale is displayed by highlighting a part of the scale (between the current value and the setpoint value) and by displaying in a graphically attenuated manner (in transparency for example) the remainder of this scale, as specified hereinbelow.

Furthermore, advantageously, in the case of preselection (for a flight parameter) of a, so-called preset, guidance setpoint, a graphical relationship between the current value of said flight parameter and said preset guidance setpoint is added to the scale dedicated to this flight parameter, so as to show the relationship (and the direction) between the current value and this preselection. Moreover, when the preset guidance setpoint is validated and becomes a new effective guidance setpoint, the scale is unraveled between the current value and this new effective guidance setpoint.

Moreover, in an advantageous manner, during manual piloting of the aircraft (when the automatic piloting system is disengaged), all the scales whose corresponding flight parameter is subjected to the manual piloting mode are unraveled on the viewing screen in their totality so as to create a characteristic visual differentiation between this manual piloting mode and another piloting mode (of automatic type).

Furthermore, during the implementation by the guidance system, either of a mode of capture of a guidance setpoint of a flight parameter, or of a protection relating to a flight parameter, an animation representing a dynamic and contextual graphical behavior, which enables this situation to be properly understood, is displayed on the scale dedicated to this flight parameter. More precisely:
  during the implementation of a guidance setpoint capture mode, an animation which illustrates the state of capture of this guidance setpoint is displayed; and
  during the implementation of a protection relating to a flight parameter, an animation which makes it possible to show what is protected by the guidance system is displayed.

Moreover, in a particular embodiment, when the guidance system has two guidance setpoint values that it may not hold simultaneously, the one which is considered to be of priority by the guidance system is highlighted in a graphical manner on the viewing screen.

Furthermore, advantageously, if for a flight parameter, a guidance setpoint actually taken into account by the guidance system is different from an input guidance setpoint, the graphical representation of the guidance setpoint is split on the display element dedicated to this flight parameter into two parts, and the part relating to the guidance setpoint actually taken into account is highlighted while preserving a representation of the part relating to the guidance setpoint input by the pilot.

Within the framework of the present invention, a graphical highlighting of an element, especially of a scale, can be carried out in various ways and especially by a particular contrast, a different graphical design, wider lines, accentuated brightness or contrasts, further graduations, modifications of the size of the characters, etc.

Thus, in particular with the aid of the aforementioned characteristics, the display method in accordance with the invention supports the understanding by the pilot of the behavior of the aircraft's guidance modes by a dynamic and contextual graphical modification of the elements displayed on a viewing screen of PFD type.

The present invention also presents the following advantages:
  the display implemented is universally understandable, whatever the pilot's language and culture of origin;
  it bolsters the learning of the pilot who can continue to learn during the operational phases, since the interface used for the implementation of the invention will afford him an understanding about the behavior of the guidance system throughout its use; and it makes it possible to further explain the objectives sought by the guidance system.

The present invention also relates to a device for displaying flight parameters on an aircraft, in particular a transport airplane.

According to the invention, said device of the type comprising display means comprising at least one viewing screen, preferably a piloting screen of PFD ("Primary Flight Display") type, which is provided with display elements (or zones) dedicated to flight parameters and each comprising at least one corresponding scale, said aircraft being capable of being guided by a guidance system according to one of a plurality of guidance modes, is noteworthy in that it comprises means for monitoring said aircraft guidance system so as to be able to detect a situation in which: the aircraft is guided by said guidance system according to a guidance mode having as objective at least one given guidance setpoint relating to a given flight parameter and said guidance mode holds this given guidance setpoint, and wherein, when such a situation is detected, said display means highlight, on the display element dedicated to said flight parameter and displayed on the viewing screen, a scale part which is reduced to a size corresponding at most to a holding range for said guidance setpoint.

In a particular embodiment, said device comprises, moreover, means for monitoring the aircraft which are capable of detecting at least the trend of a flight parameter of the aircraft.

Moreover, in a preferred embodiment, said viewing screen is a touchscreen, and it is formed so that an operator can act on the display by direct contact with said touchscreen, in particular so as to input a datum into the guidance system.

The present invention also relates to an aircraft guidance system, namely a flight director or an automatic piloting system, which comprises a dialog device (to allow dialog between said guidance system and an operator, especially a pilot, of said aircraft), which exhibits the characteristics of the display device such as aforementioned.

The present invention relates furthermore to an aircraft, in particular a transport airplane, which is equipped:

with such a display device; and/or
with such a guidance system.

BRIEF DESCRIPTION OF THE DRAWINGS

The figures of the appended drawing will elucidate the manner in which the invention may be embodied. In these figures, identical references designate similar elements.

DETAILED DESCRIPTION OF THE PREFERRED EMBODIMENTS

Figure 1:
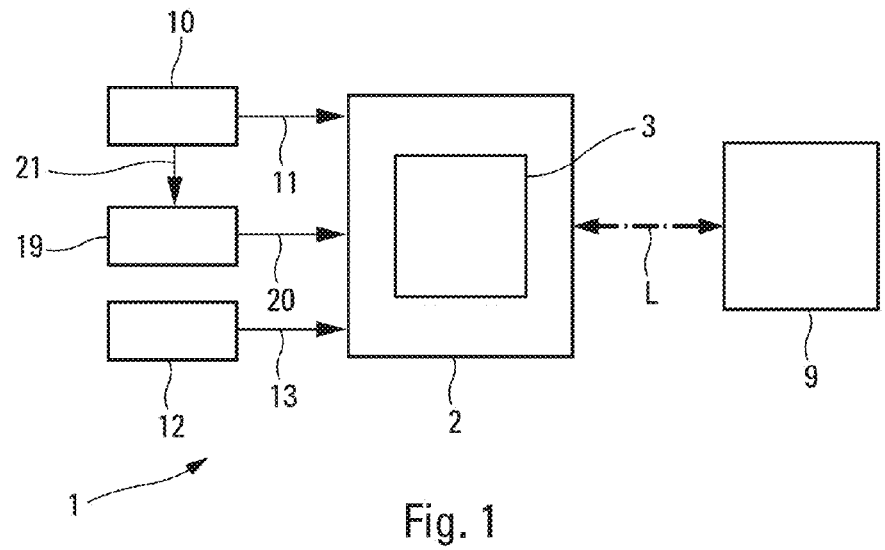
FIG. 1 is the schematic diagram of a display device in accordance with the invention.

The display device 1 in accordance with the invention and represented schematically in FIG. 1 is aboard an aircraft, in particular a transport airplane, not represented, and is arranged in the flight deck of said aircraft. This display device 1 is intended to display flight parameters (speed, heading, altitude, etc.) of the aircraft.

Accordingly, said device 1 comprises display means 2 comprising at least one viewing screen 3, preferably a piloting screen of PFD ("Primary Flight Display") type, which is provided with display elements 4, 5, 6, 7 and 8 (or display zones) dedicated to flight parameters and each comprising at least one corresponding scale.

In the displays shown in FIGS. 2 to 10 have been represented especially:

a display element 4 relating to the speed and comprising a vertically displayed speed scale 14;
a display element 5 relating to the altitude and comprising a vertically displayed altitude scale 15 (or flight level FL scale);
a display element 6 relating to the vertical speed and comprising a vertically displayed vertical speed scale 16 VS (or FPA slope scale);
a display element 7 relating to the heading and comprising a heading scale 17, in the form of an ellipse. For simplifying reasons, this display element 7 is not represented in FIGS. 6 to 10; and
a display element 8 comprising especially an attitude scale 18.

This display device 1 comprises moreover:

a set 10 of usual information sources, which are connected by way of a link 11 to said display means 2 and which are capable of providing the current values of a plurality of flight parameters (speed, heading, etc.) of the aircraft; and
usual means 12 which are connected by way of a link 13 to said display means 2 and which allow an operator, in particular a pilot of the aircraft, to input data into said device 1 and to manage the operation of the latter (in particular guidance setpoints).

Moreover, said aircraft is capable of being guided by a usual guidance system 9 according to one of a plurality of different guidance modes.

Figure 9:
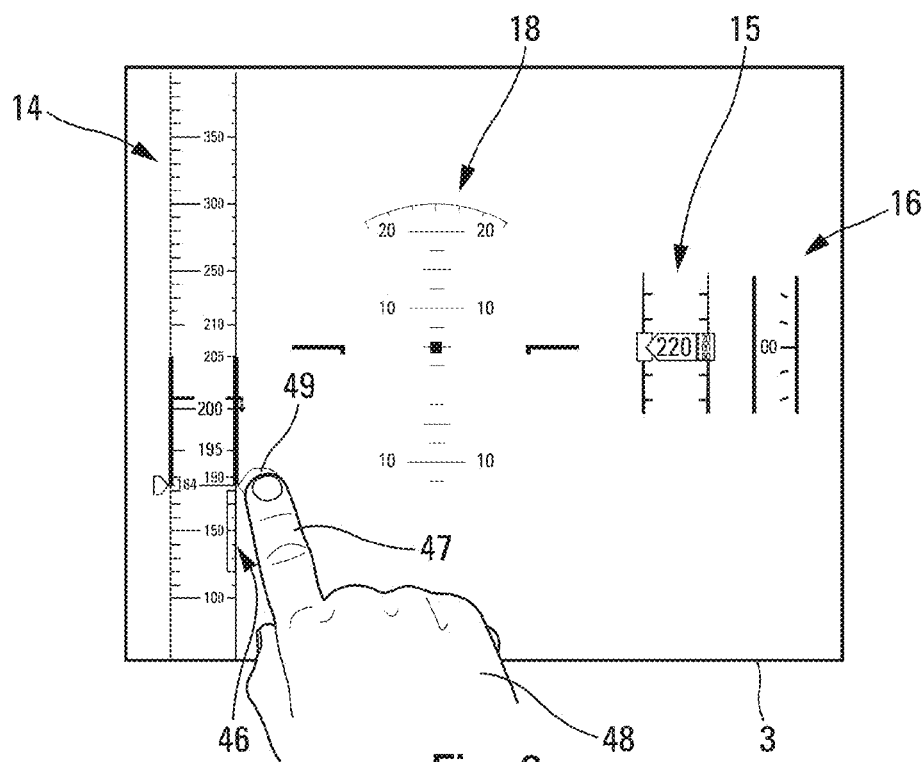
Figure 10:
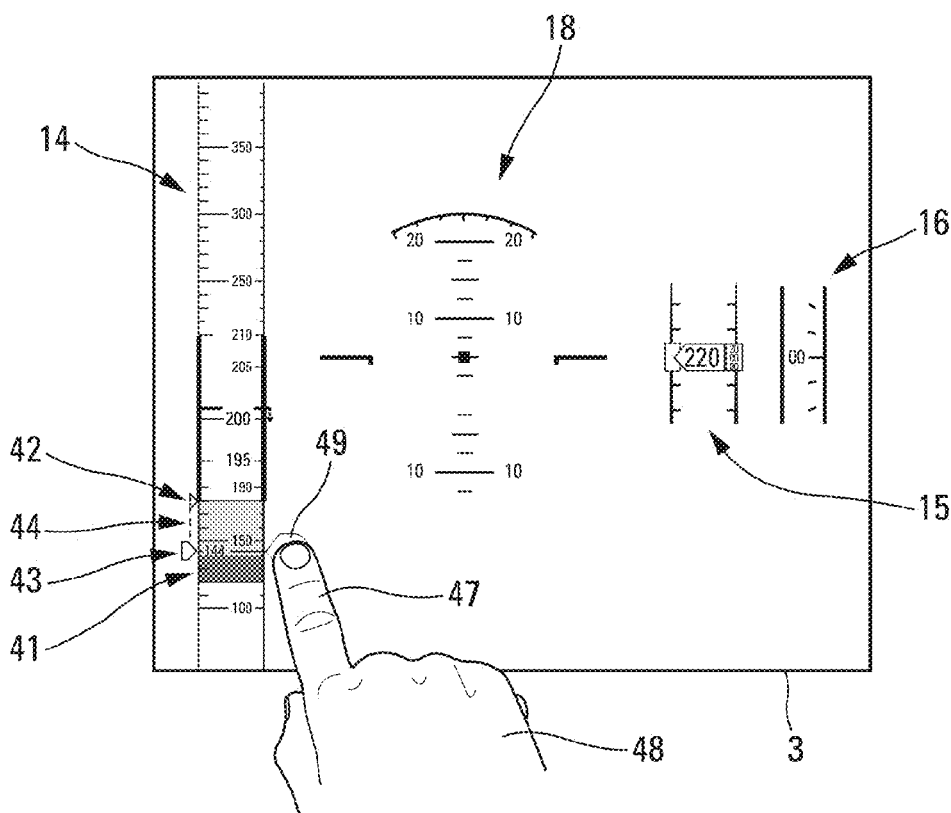

The display device 1 represents, preferably, a dialog device which allows dialog between at least one operator of the aircraft, especially a pilot, and said aircraft guidance system 9, as illustrated by a chain-dotted link L in FIG. 1. Accordingly, said screen 3 is capable of retrieving guidance information of said guidance system 9, and is optionally intended to input data into said guidance system 9. For this purpose, in a particular embodiment of the dialog device, said screen 3 is a touchscreen, and comprises graphical objects which can be controlled by the operator by direct contact on the touchscreen 3, preferably by finger contact (as represented in FIGS. 9 and 10), with the aim especially of modifying setpoint values of the guidance system 9. Furthermore, the dialog device can also comprise usual control means, such as physical buttons that it is possible to rotate, a trackball, a computer mouse and/or a touchpad (of the multikey type or otherwise), which form for example part of said means 12.

The present invention also relates to such an aircraft guidance system 9, namely a flight director (which calculates piloting setpoints as a function of guidance setpoints) or an automatic piloting system (which makes it possible to follow guidance setpoints in an automatic manner), which comprises a dialog device such aforementioned, to allow dialog between said guidance system 9 and a pilot of said aircraft.

According to the invention, said display device 1 comprises, moreover, monitoring means 19 which are connected by way of a link 20 to the display means 2 and which are, especially, able to monitor said guidance system 9 and the aircraft (in particular by receiving current values of the set 10 via a link 21). Said monitoring means 19 are capable, especially, of detecting a situation in which at one and the same time:

the aircraft is guided by said guidance system 9 according to a guidance mode having as objective at least one given guidance setpoint relating to a given flight parameter; and said guidance mode holds this given guidance setpoint.

Figure 2:
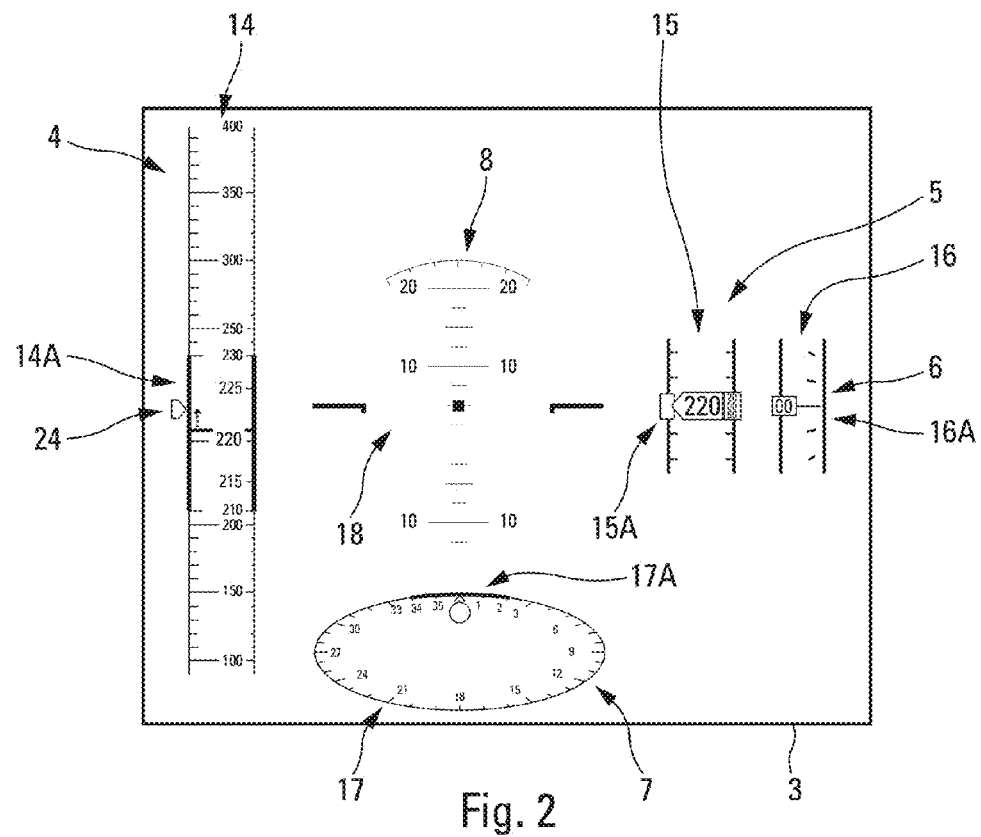
FIGS. 2 to 10 schematically illustrate various displays in accordance with the invention, which make it possible to highlight the essential characteristics of the invention.

Moreover, according to the invention, when such a situation is detected, said display means 2 highlight, on the display element dedicated to said flight parameter and displayed on the viewing screen 3, a scale part which is reduced to a size corresponding at most to a holding range for said guidance setpoint, as represented by way of example for the altitude scale 15 in FIG. 2, of which only the scale part 15A situated around the current value (FL220) is displayed. A scale part thus reduced is termed "reduced scale part". Said holding range can be a range considered to be acceptable for this guidance setpoint or else simply the current value alone (which, in this case, corresponds to the setpoint value).

Indeed, when the objective of a guidance mode is a given guidance setpoint, and when this mode actually holds this guidance setpoint, there is no need to view the whole of the scale of values of this flight parameter. In this case, the scale is therefore reduced to the current value alone (which is in this case the setpoint value), or to the holding range. By way of illustration, if a speed holding mode is considered efficacious at +/−10 kts (kts for "knots"), and the setpoint speed is held by the guidance system 9 at +/−10 kts, the speed scale 14 displayed on the screen 3 presenting the corresponding parameter comprises a part 14A which is reduced to this range, namely substantially between 210 and 230 kts around the current value of a little more than 220 kts, with a symbol 24 illustrating the setpoint, in the example of FIG. 2.

Furthermore, if the means 19 detect that said aircraft is guided with the holding of a plurality of guidance setpoints, said display means 2 highlight a reduced scale part for each of said guidance setpoints, as is represented in FIG. 2 for the reduced scale parts 14A, 15A, 16A and 17A which are highlighted on this display, relating respectively to the display elements 4, 5, 6 and 7. Thus, in the case where the guidance system 9 holds all its guidance setpoints, a single glance at the screen 3 allows the pilot to know visually (on viewing the reduced scale parts) that all the requested guidance setpoints are upheld by said guidance system 9. It will be noted that in FIG. 2, for the scales 14 and 17, the remainder (as specified hereinbelow) of the scale has been represented as a fine line, but which is not completely attenuated for reasons of understanding of the drawing. However, in the display envisaged on the aircraft, especially to allow the pilot to easily recognize the aforementioned situation (all the guidance setpoints upheld), the display of this scale remainder is very attenuated.

Within the framework of the present invention, a graphical highlighting on the screen 3 of an element or part of a scale can be carried out in various ways and especially by a contrast, a different graphical design, wider lines, accentuated brightness or contrasts, further graduations, different sizes of characters, etc.

The display device 1 in accordance with the invention therefore supports the understanding by the pilot of the behavior of the aircraft guidance modes by a dynamic and contextual graphical modification of the elements of the screen 3 of PFD type.

Said device 1 also presents the following advantages:
the display implemented is universally understandable, whatever the pilot's language and culture of origin;
it bolsters the learning of the pilot who can continue to learn during the operational phases, since the screen 3 will afford him an understanding about the behavior of the guidance system 9 throughout its use; and
the display implemented makes it possible to further explain the objectives sought by the guidance system 9.

Figure 3:
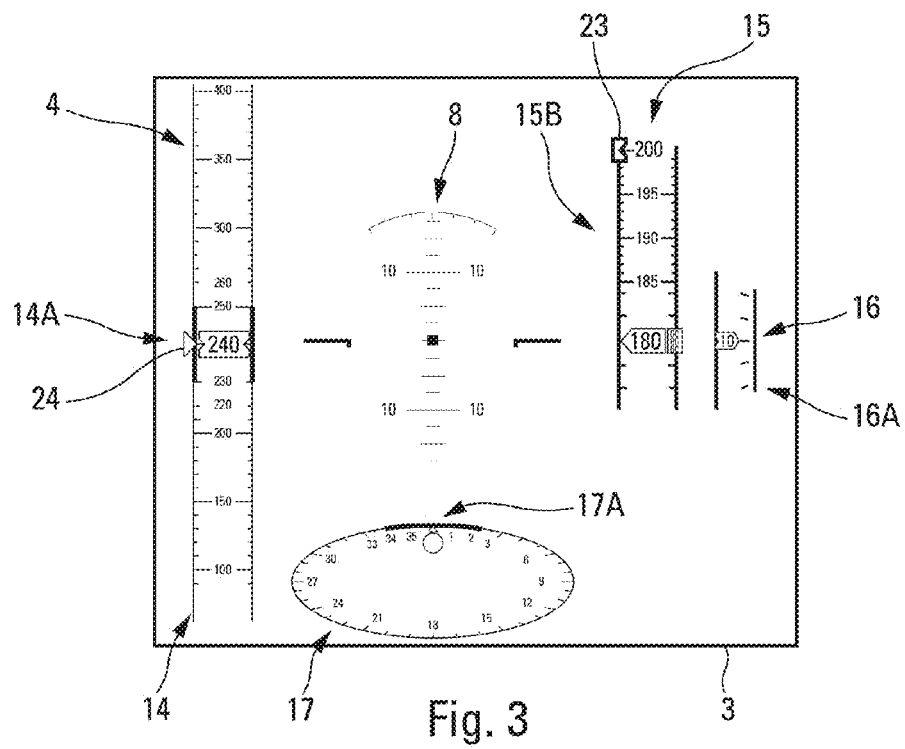

Moreover, if a guidance setpoint relating to a flight parameter (speed, heading, etc.) is modified by the input of a new guidance setpoint (by the pilot with the aid of the means 12 for example or by a flight management system in managed mode for example), the display means 2 highlight a scale part starting from the current value of said flight parameter as far as this new guidance setpoint, as represented by way of example in FIG. 3. In this FIG. 3 there has been highlighted, for the altitude scale 15, a scale part 15B as far as a symbol 23 illustrating the setpoint value (FL 200, namely 20000 feet) of the altitude. Thus, the pilot is informed visually of this situation, and especially of the difference between the current value and that which the guidance system 9 seeks to attain.

In the same manner, if the monitoring means 19 detect that the current value of a flight parameter strays from the guidance setpoint of this flight parameter (for example because of a wind gradient which modifies the air speed), the display means 2 highlight a scale part which is defined between these two values.

Furthermore, the monitoring means 19 are also formed so as to be able to detect in a usual manner the trend, increasing or decreasing, of a flight parameter of the aircraft. The display means 2 display the part of the scale (preferably the half-scale) onward of the current value of this flight parameter, corresponding to the trend of the aircraft, if there is no corresponding guidance setpoint, doing so as far as the guidance setpoint if it is situated on this scale part.

Figure 4:
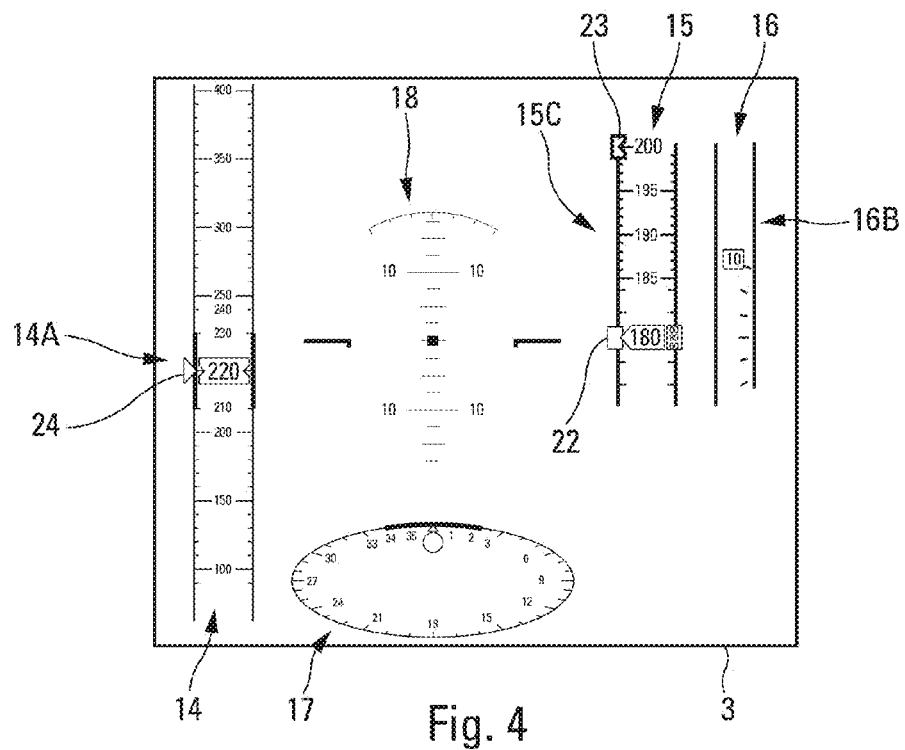

Thus, by way of illustration:
if the aircraft is climbing, the scales 15 and 16 of altitude and of vertical speed VS (or of slope FPA) are unraveled toward the high values (direction of flight of the aircraft), as represented for example in FIG. 4 with the scale parts 15C and 16B for the altitude and vertical speed scales;
if the aircraft is descending, the altitude and vertical speed scales VS (or slope scale FPA) are unraveled toward the low values (direction of flight of the aircraft);
if the aircraft is accelerating, the air speed scale 14 (CAS) is unraveled toward the high speeds; and
if the aircraft is decelerating, the air speed scale 14 (CAS) is unraveled toward the low speeds.

Likewise, when turning, the direction of turn is indicated by an unraveling of the heading scale 17 in the direction of the turn.

Figure 5:
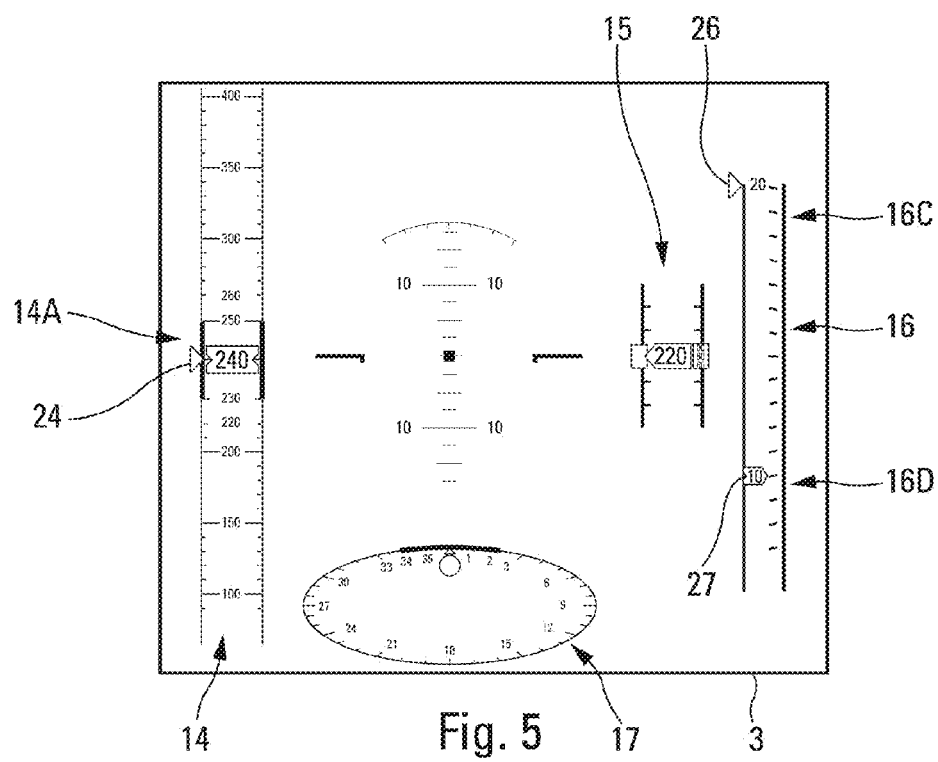

Furthermore, the monitoring means 19 verify whether the motion of the aircraft is consistent with a guidance setpoint relating to a flight parameter. As a function of this verification:
if the motion of the aircraft is consistent with this guidance setpoint, the display means 2 display only a part of a half-scale, or the complete half-scale, onward of the current value of this flight parameter, doing so in the direction of the motion of the aircraft; and
if the motion of the aircraft is not consistent with a guidance setpoint, the display means 2 unravel the scale in both directions, thereby making it possible to attract the attention of the pilot who will have to determine whether or not this corresponds to a normal guidance situation. By way of illustration, if the pilot has input a vertical climb speed setpoint of +2000 feet/min (symbol 26), and the aircraft is in reality descending at −1000 feet/min (symbol 27), the vertical speed scale 16 is unfurled in both directions: upwards (16C) as far as the guidance setpoint of +2000 feet/min, and downwards (16D) over the whole of the half-scale, as represented in FIG. 5.

Furthermore, in a particular embodiment, for a flight parameter corresponding to a speed of the aircraft, the display means 2 display, in a permanent manner, the set of useful speed values on the speed scale 14. This display allows the pilot to have a visual awareness of the state of the speed, namely if it is high (the current value is situated graphically at the top of the fixed scale) or low (the current value is situated graphically at the bottom of the fixed scale).

Moreover, in a particular embodiment, for at least one scale dedicated to a flight parameter (for example a speed scale 14 and/or a heading scale 17), the display means 2 display the entirety of the scale while highlighting a part of the scale 14A, 17A, as specified hereinbelow, and while moreover displaying the remainder of this scale in a graphically attenuated manner (in transparency for example), as represented for example in FIGS. 2 to 5.

Thus, the entirety of the scale 14, 17 is always visible but in part in an attenuated manner, so as especially to be able to display characteristic values.

In this particular embodiment, as illustrated for example in FIG. 2:
- for the speed scale 14, the entirety of the speed scale is always displayed, but in part in a less visible manner, so as to always retain the relationship with the acceptable minimum and maximum speeds (and/or the characteristic speeds when this is necessary); and
- for the heading scale 17, the entirety of the heading scale (in the form of an ellipse) is always displayed, but in part in a less visible manner. In this case, it is for example possible to display the characteristic headings (for example every 45° with respect to the current heading) on this scale 17.

Furthermore, in the case of preselection of a, so-called preset, guidance setpoint for a flight parameter, the display means 2 add to the scale dedicated to this flight parameter a graphical relationship between the current value of said flight parameter and said preset guidance setpoint, so as to show the relationship (and the direction) between the current value and this preselection. Moreover, when the preset guidance setpoint is validated and becomes a new effective guidance setpoint, the display means 2 unravel the scale between the current value and this new effective guidance setpoint. There is therefore a graphical difference between a guidance setpoint actually taken into account by the system, and a simple pre-set (not yet validated).

Moreover, during manual piloting (automatic piloting system disengaged) of the aircraft, the display means 2 unravel on the viewing screen 3 all the scales in their totality so as to create a characteristic visual differentiation.

These various types of representation can be mixed, that is to say, if for example an automatic thrust system (A/THR) of the aircraft is engaged and holds the speed, the speed scale 14 is displayed in a reduced manner (scale part 14A) around the current value (which is also the setpoint). If, at the same time, the lateral and vertical piloting is manual (automatic pilot disengaged), the altitude scale 15 and heading scale 17 are displayed in their totality.

Furthermore, during the implementation by the guidance system 9 of a mode of capture of a guidance setpoint of a flight parameter or of a protection relating to a flight parameter, the display means 2 display on the scale dedicated to this flight parameter an animation representing a dynamic and contextual graphical behavior, which enables this situation to be properly understood by the pilot. More precisely:
- during the implementation by the guidance system 9 of a mode of capture of a guidance setpoint of a flight parameter, the display means 2 display an animation (dynamic and contextual graphical behavior) which supports the understanding of the state of capture of this guidance setpoint. By way of example, when the altitude capture mode engages, an animation on the altitude scale makes it possible to highlight that the guidance system 9 attains the setpoint. This animation can comprise, for example, arrows, animated chevrons or square brackets on the altitude scale showing the attaining of the setpoint altitude; and
- during the implementation by the guidance system 9 of a protection relating to a flight parameter, the display means 2 display an animation (dynamic and contextual graphical behavior) which supports the explanation of the behavior of the guidance system 9 so as to clearly show what is protected by the system 9. By way of example, during a minimum speed protection (to protect from stalling), this animation can represent a pulsing red plateau which is displayed on the speed scale 14 at the level of the protected speed.

Moreover, in a particular embodiment, when the guidance system 9 has two guidance setpoint values that it may not hold simultaneously (for example an air speed CAS and a vertical speed VS), the display means 2 highlight, in a graphical manner, on the viewing screen 3, the one which is considered to be of priority by the guidance system. Thus, in this particular embodiment, the device 1 highlights the guidance setpoint value that the guidance system 9 considers to be of priority. By way of example, in a usual mode VS, the upholding of the vertical speed setpoint VS has priority with respect to the speed setpoint as long as the latter does not go below the minimum operational speed (VLS). In this case, if the vertical speed setpoint VS is not compatible with the upholding of the setpoint speed, this vertical speed setpoint VS is rendered visible graphically as having priority over the speed setpoint. On the other hand, if the speed parameter regains priority (attaining of the minimum operational speed), this upholding of minimum speed is rendered visible graphically as having priority over the vertical speed setpoint VS.

Figure 6:
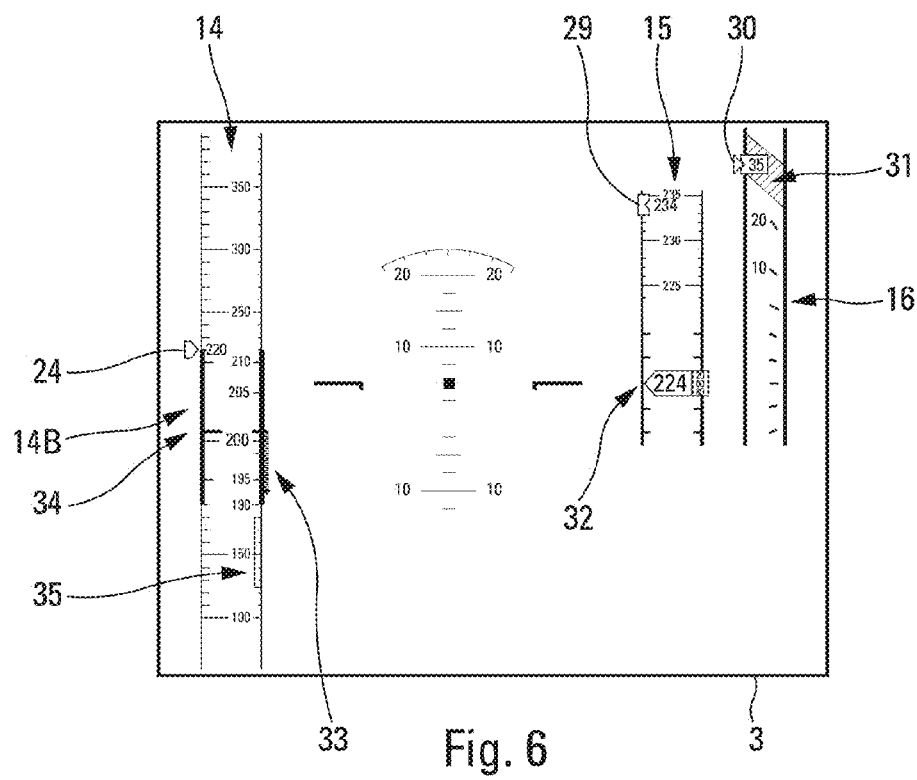
Figure 7:
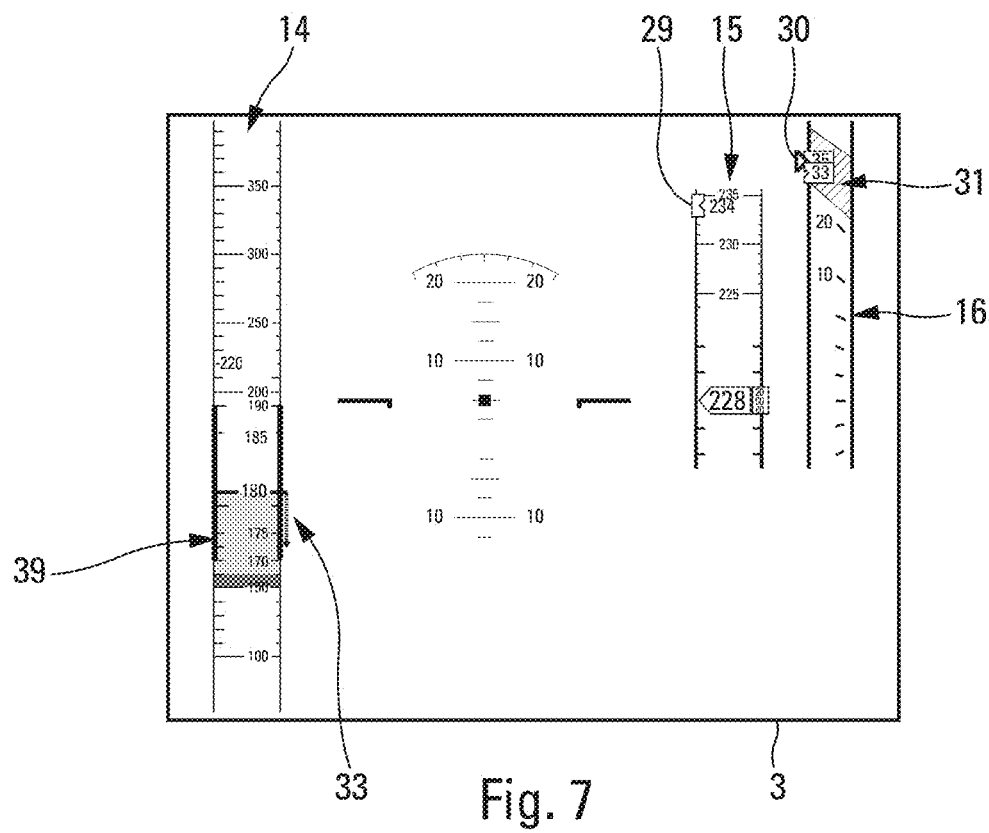
Figure 8:
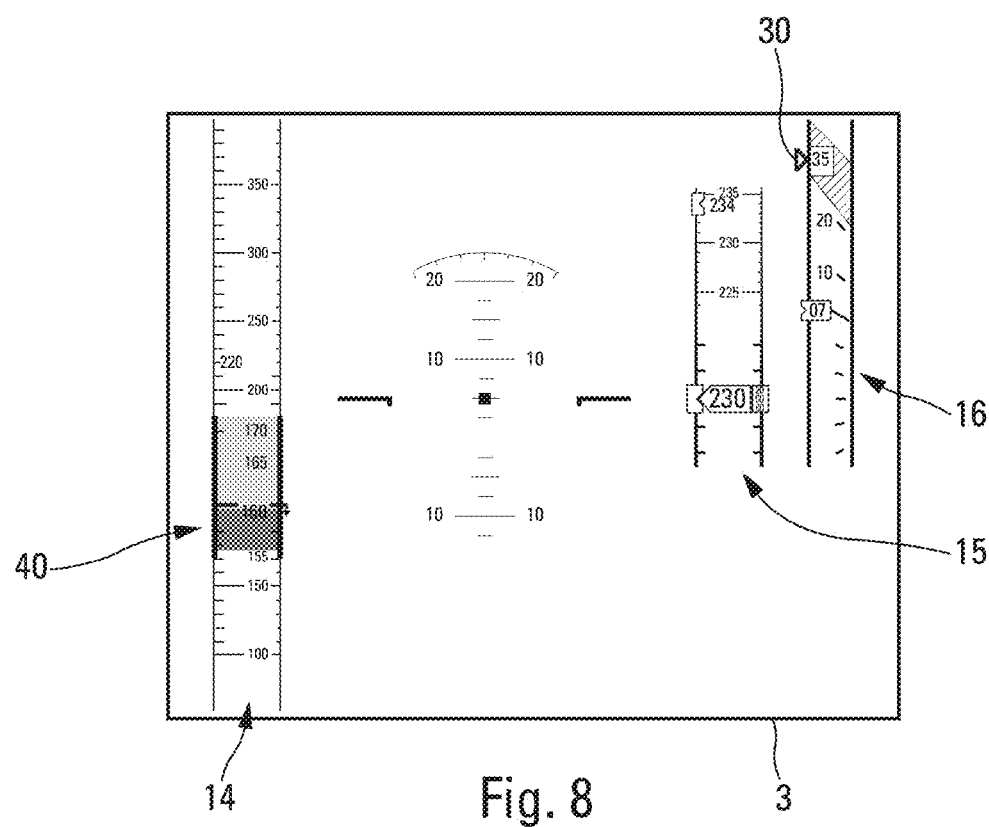

Such a situation has been represented in FIGS. 6 to 8. More precisely:

A/ for the initial situation, the aircraft is flying level and with managed speed. For the guidance system 9, the priority is to uphold the altitude. A flight level (FL) of 234 (23400 feet) has been preselected, as illustrated by the symbol 29 on the altitude scale of FIG. 6 (comprising a symbol 32 indicating the current altitude). It is desired to attain it with a vertical speed VS of 3500 feet/minute (symbol 30 on the vertical speed scale 16). A range 31, for example in amber, on the scale 16 indicates that this vertical speed will not be able to be upheld without causing a change in the other dimensions (of speed in this instance);

B/ the pilot selects a higher vertical speed than the indicated range. The new priority for the guidance system 9 is to attain this vertical speed VS. The aircraft commences its climb toward the flight level 234;

C/ the setpoint speed cannot be upheld. The speed drops, but does not yet attain the minimum speed. The priority, at this juncture, is still to uphold the vertical speed VS;

D/ the speed continues to drop (symbol 33 in FIG. 6) and almost attains the minimum operational speed VLS (symbol 35). The speed scale 14 is unfurled so as to illuminate the whole of the part situated between the setpoint value (symbol 24) and the current value (shown by an arrow 34 in FIG. 6), as well as the zone situated in the direction of the speed trend (namely toward the low speeds). This situation is represented in FIG. 6;

E/ the current speed of the aircraft attains the minimum operational speed VLS. The device 1 reacts: the speed target (previous symbol 24) changes color (and becomes for example amber). The vertical indicator 35 is transformed into a zone 39 which is displayed over the whole of the width of the scale 14 (FIG. 7). The speed therefore has priority over the vertical speed. The action of the system will be to act on the vertical speed VS (the symbol 30 which represents the guidance setpoint which is no longer upheld changes color and becomes for example amber);

F/ the speed continues to drop. If it oversteps the limit highlighted by the zone 40 in FIG. 8, a disabling animation (for example red) is displayed on the screen 3.

Moreover, in the case of priority of a protection on at least one guidance setpoint, in the same manner, when the guidance setpoint or setpoints lose their priority for reasons of transcendence by flight control protections (typically a low speed or high speed protection), the guidance parameter which is no longer upheld is indicated by a dedicated graphical representation (for example switching of the setpoint color to amber).

Furthermore, if for a flight parameter, a guidance setpoint actually taken into account by the guidance system 9 is different from a guidance setpoint input (by the pilot with the aid of the means 12 or automatically by a flight management system), since it is kept in check by the system, the display means 2:

split, on the display element dedicated to this flight parameter, the graphical representation of the guidance setpoint into two parts; and highlight the part relating to the guidance setpoint actually taken into account, while preserving a representation of the part relating to the guidance setpoint input by the pilot.

By way of example, if the managed approach speed (VAPP) is lower than the minimum operational speed (VLS) corresponding to the current configuration of slats and flaps, the device 1 indicates in the form of a dedicated graphical representation (splitting or deformation of the representation of the initial setpoint) that the air speed setpoint (CAS) actually taken into account by the guidance system 9 is limited by the speed VLS.

Such a situation has been represented in FIGS. 9 and 10. More precisely:

A/ for the initial situation, the aircraft is flying level and with managed speed. For the guidance system 9, the priority is to uphold the altitude. The pilot selects a lower speed than the current speed. Accordingly, he acts directly with a finger 47 of a hand 48 on an interaction means 49 of the screen 3, which can be grasped and moved along the scale 14, so as to modify the associated guidance setpoint, as represented in FIG. 9; and B/ if the pilot selects a target lower than the limit VLS, as represented in FIG. 10 (49 in the zone 41), the speed target splits into two symbols 42 and 43 connected together by a line 44 and stretches. Its end 43 representing the true target shows that the system 9 will prevent the speed from dropping below the minimum operational speed VLS by locking it.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of displaying a flight parameter of an aircraft, with the aid of a viewing screen including a display element dedicated to the flight parameter, the flight parameter having a corresponding viewable scale, the aircraft being guided by a guidance system according to a guidance mode, the method comprising:

monitoring the guidance system to detect a situation in which a guidance setpoint relating to the flight parameter is modified by the guidance system, while the aircraft is guided by the guidance system according to the guidance mode having the guidance setpoint, and the guidance mode holds the guidance setpoint;

providing a holding range of the flight parameter for the guidance setpoint, wherein the guidance setpoint is highlighted on the display element dedicated to the flight parameter and displayed on the viewing screen;

reducing the viewable scale of the holding range of the flight parameter to a size of the holding range of the flight parameter in comparison to the remainder of the scale outside of the holding range upon detection of the situation;

performing a check to verify whether a motion of the aircraft is consistent with the guidance setpoint relating to the flight parameter;

displaying the scale having a current value of the flight parameter, when the motion of the aircraft is consistent with the guidance setpoint; and automatically adjusting the size of the scale of the flight parameter by delimiting the holding range in a first direction and a second direction based on the current value of the flight parameter and the guidance setpoint when the motion of the aircraft is inconsistent with the guidance setpoint, the first and second directions being opposite from each other.

2. The method as claimed in claim 1, further comprising, when the aircraft is guided with the guidance setpoint relating to the flight parameter, highlighting a scale part for the guidance setpoint.

3. The method as claimed in claim 1, further comprising, when the guidance setpoint is modified by an input of a new guidance setpoint for the flight parameter, highlighting a scale part starting from the current value of the flight parameter as far as the new guidance setpoint, and when the current value of the flight parameter strays from the guidance setpoint, highlighting the scale part defined between the current value of the flight parameter and the guidance setpoint.

4. The method as claimed in claim 1, further comprising:
monitoring a trend, increasing or decreasing, of the flight parameter of the aircraft, and
adjusting the scale of the current value of the flight parameter, based on the trend of the flight parameter of the aircraft.

5. The method as claimed in claim 1, further comprising:
for the flight parameter corresponding to a speed of the aircraft, displaying a set of speed values permanently on a speed scale.

6. The method as claimed in claim 1, further comprising:
for at least one scale dedicated to the flight parameter, displaying an entirety of the scale by highlighting a part of the scale and by displaying a remainder of the scale in a graphically attenuated manner.

7. The method as claimed in claim 1, further comprising:
in a case of preselection for the flight parameter of a preset guidance setpoint, adding a graphical relationship between the current value of the flight parameter and the preset guidance setpoint to the scale dedicated to the flight parameter, and when the preset guidance setpoint is validated and becomes a new effective guidance setpoint, adjusting the scale based on the current value and the new effective guidance setpoint.

8. The method as claimed in claim 1, further comprising:

during manual piloting of the aircraft, adjusting the scale whose corresponding flight parameter is subjected to a manual piloting mode on the viewing screen to create a characteristic visual differentiation between the manual piloting mode and another, non-manual, piloting mode.

9. The method as claimed in claim 1, further comprising:

during implementation by the guidance system of a mode of capture of the guidance setpoint of the flight parameter, displaying an animation representing a dynamic and contextual graphical behavior on the scale dedicated to the flight parameter.

10. The method as claimed in claim 1, further comprising:

during implementation by the guidance system of a protection relating to the flight parameter, displaying an animation representing a dynamic and contextual graphical behavior on the scale dedicated to the flight parameter.

11. The method as claimed in claim 1, further comprising:

when the guidance system has two guidance setpoint values that the guidance system does not hold simultaneously, highlighting at least one of the setpoint values which is considered to be of priority based on the guidance setpoint by the guidance system in a graphical manner on the viewing screen.

12. The method as claimed in claim 1, further comprising:

when for the flight parameter, the guidance setpoint actually taken into account by the guidance system is different from an input guidance setpoint, splitting a graphical representation of the guidance setpoint on the display element dedicated to the flight parameter into two parts, and highlighting a part relating to the guidance setpoint actually taken into account, while preserving the representation of the part relating to the input guidance setpoint.

13. A device for displaying a flight parameter of an aircraft, the device comprising:

a display device having a viewing screen including a display element dedicated to the flight parameter and a corresponding viewable scale, the aircraft being guided by a guidance system according to a guidance mode; and a monitoring device that monitors the guidance system to detect a situation in which a guidance setpoint relating to the flight parameter is modified by the guidance system, while the aircraft is guided by the guidance system according to the guidance mode having the guidance setpoint, and the guidance mode holds the guidance setpoint, wherein a holding range of the flight parameter for the guidance setpoint is provided, and the guidance setpoint is highlighted on the display element dedicated to the flight parameter and displayed on the viewing screen, wherein the display device highlights the viewable scale of the holding range of the flight parameter, when the situation is detected, on the display element dedicated to the flight parameter and displayed on the viewing screen, wherein the viewable scale of the holding range of the flight parameter is reduced to a size of the holding range of the flight parameter in comparison to the remainder of the scale outside of the holding range upon detection of the situation, wherein the monitoring device is configured to verify whether a motion of the aircraft is consistent with the guidance setpoint relating to the flight parameter, and wherein the display device is configured to:

display the scale having a current value of the flight parameter, when the motion of the aircraft is consistent with the guidance setpoint; and automatically adjust the size of the scale of the flight parameter by delimiting the holding range in a first direction and a second direction based on the current value of the flight parameter and the guidance setpoint when the motion of the aircraft is inconsistent with the guidance setpoint, the first and second directions being opposite from each other.

14. The display device as claimed in claim 13, wherein the monitoring device detects a trend of the flight parameter of the aircraft.

15. The display device as claimed in claim 13, wherein the viewing screen is touch-sensitive.

* * * * *